US011129379B2

(12) United States Patent
Alsberg et al.

(10) Patent No.: US 11,129,379 B2
(45) Date of Patent: Sep. 28, 2021

(54) ORGAN TRANSPORTER WITH SUPPLEMENTAL OXYGENATION SYSTEM

(71) Applicant: LIFELINE SCIENTIFIC, INC., Itasca, IL (US)

(72) Inventors: Keith Alsberg, Itasca, IL (US); Peter Demuylder, Itasca, IL (US); Gunther Van Weiser, Itasca, IL (US); Jerry O'Leary, Itasca, IL (US); David Kravitz, Itasca, IL (US)

(73) Assignee: LIFELINE SCIENTIFIC, INC., Itasca, IL (US)

( * ) Notice: Subject to any disclaimer, the term of this patent is extended or adjusted under 35 U.S.C. 154(b) by 213 days.

(21) Appl. No.: 15/966,595

(22) Filed: Apr. 30, 2018

(65) Prior Publication Data

US 2018/0310549 A1 Nov. 1, 2018

Related U.S. Application Data

(60) Provisional application No. 62/491,863, filed on Apr. 28, 2017.

(51) Int. Cl.
*A01N 1/02* (2006.01)

(52) U.S. Cl.
CPC ......... *A01N 1/0247* (2013.01); *A01N 1/0273* (2013.01); *A01N 1/0278* (2013.01)

(58) Field of Classification Search
CPC .................................................. A01N 1/0247
USPC ...................................................... 435/284.1
See application file for complete search history.

(56) References Cited

U.S. PATENT DOCUMENTS

| 3,632,473 A | * | 1/1972 | Belzer | A01N 1/02 435/1.2 |
| 3,935,065 A | * | 1/1976 | Doerig | A01N 1/0247 435/1.2 |
| 5,362,622 A | * | 11/1994 | O'Dell | A01N 1/02 435/284.1 |
| 6,673,594 B1 | | 1/2004 | Owen et al. | |
| 7,998,725 B2 | | 8/2011 | Schein et al. | |

(Continued)

FOREIGN PATENT DOCUMENTS

| JP | H03-74302 A | 3/1991 |
| RU | 179 217 U1 | 5/2018 |
| WO | 2013/068753 A1 | 5/2013 |

OTHER PUBLICATIONS

Gray et al., CO2 in large-scale and high-density CHO perfusion culture, 1996, Cytotechnology, 22, pp. 65-78. (Year: 1996).*

(Continued)

*Primary Examiner* — Holly Kipouros
(74) *Attorney, Agent, or Firm* — Oliff PLC

(57) ABSTRACT

An apparatus for perfusing an organ or tissue including a perfusion circuit for perfusing the organ or tissue with liquid perfusate; and an oxygenation system for oxygenating perfusate that recirculates through the perfusion circuit. The oxygenation system includes an oxygen circuit for delivering oxygen to the liquid perfusate and an air circuit for delivering ambient air to the liquid perfusate. The air may be pumped through the oxygenation system via an air pump. The air or oxygen may be bubble through the perfusate to increase oxygen levels in the perfusate. Such supplemental oxygen may beneficial during hypothermic preservation of organs.

16 Claims, 2 Drawing Sheets

(56) References Cited

U.S. PATENT DOCUMENTS

| | | |
|---|---|---|
| 9,357,767 B2 | 6/2016 | Steinman et al. |
| 2004/0058432 A1* | 3/2004 | Owen .................. G06F 16/955 |
| | | 435/284.1 |
| 2005/0153271 A1* | 7/2005 | Wenrich ............... A01N 1/0247 |
| | | 435/1.1 |
| 2006/0121439 A1* | 6/2006 | Baker ...................... A01N 1/02 |
| | | 435/1.2 |
| 2007/0184545 A1* | 8/2007 | Plaats .................. A01N 1/0247 |
| | | 435/284.1 |
| 2010/0304352 A1* | 12/2010 | Patrick, III .......... A01N 1/0247 |
| | | 435/1.2 |
| 2012/0178150 A1 | 7/2012 | Tempelman et al. |

OTHER PUBLICATIONS

Jul. 3, 2019 International Preliminary Report on Patentability issued in International Application No. PCT/US2018/030214.
Jul. 19, 2018 Search Report issued in International Application No. PCT/US2018/030214.
Jul. 19, 2018 Written Opinion issued in International Application No. PCT/US2018/030214.
Apr. 5, 2019 Written Opinion issued in International Application No. PCT/US2018/030214.

* cited by examiner

ORGAN TRANSPORTER WITH SUPPLEMENTAL OXYGENATION SYSTEM

This application claims the benefit of U.S. Provisional Application No. 62/491,863, filed Apr. 28, 2017.

BACKGROUND

Related technical fields include organ or tissue perfusion apparatuses that are capable of sustaining and/or restoring viability of organs or tissue and preserving organs or tissues for diagnosis, treatment, storage and/or transport. For convenience, the term "organ" as used herein should be understood to mean organ and/or tissue unless otherwise specified.

It is an objective of organ perfusion apparatus to mimic the conditions of the human body such that the organ remains viable before being used for research, diagnosis, treatment or transplantation. Many times the organ needs to be stored and/or transported between facilities. A goal of sustaining and restoring organs during perfusion is to reduce ischemia and reperfusion injury. The increase in storage periods in a normal or near normal functioning state also provides certain advantages, for example, organs can be transported greater distances and there is increased time for testing, treatment and evaluation of the organs.

In maintaining organs in near ideal conditions and physiological states it is known to provide oxygenated perfusate to an organ. U.S. Pat. Nos. 9,357,767, 7,998,725, and 6,673,594 disclose, for example, a configuration in which an organ is provided with perfusate that is oxygenated by way of gaseous oxygen provided to an oxygenating membrane, which are hereby incorporated by reference in their entirety and in which the present invention could be used.

SUMMARY

An organ transporter allows for transportation of an organ, particularly over long distances. The organ transporter may include features of an organ perfusion apparatus, such as sensors and temperature controllers, as well as cassette interface features.

When an organ or tissue has been harvested, it may be beneficial to perfuse the organ with oxygenated perfusate, which may preferably be a liquid perfusate. Although perfusate can be pre-oxygenated, the perfusate may require further oxygen during the perfusion process as the organ uses oxygen from the perfusate. Accordingly, it is desirable to provide a perfusion apparatus that can supply oxygen to the perfusate so that the perfusate can be oxygenated during perfusion.

Disclosed herein is a perfusion apparatus with an oxygenation system that provides supplemental oxygen or air to the perfusate. The oxygenation system includes a medical air pump that is designed to maintain perfusate oxygen tension at physiological levels for up to 24 hours or more. The oxygenation systems allows a user to connect an external oxygen source for rapidly charging the perfusate oxygen tension up to physiological or supra-physiological levels or any desired level during circuit set up at the donor site, upon arrival at the transplant hospital, or anywhere in between.

DETAILED DESCRIPTION OF EMBODIMENTS

Figure 1:
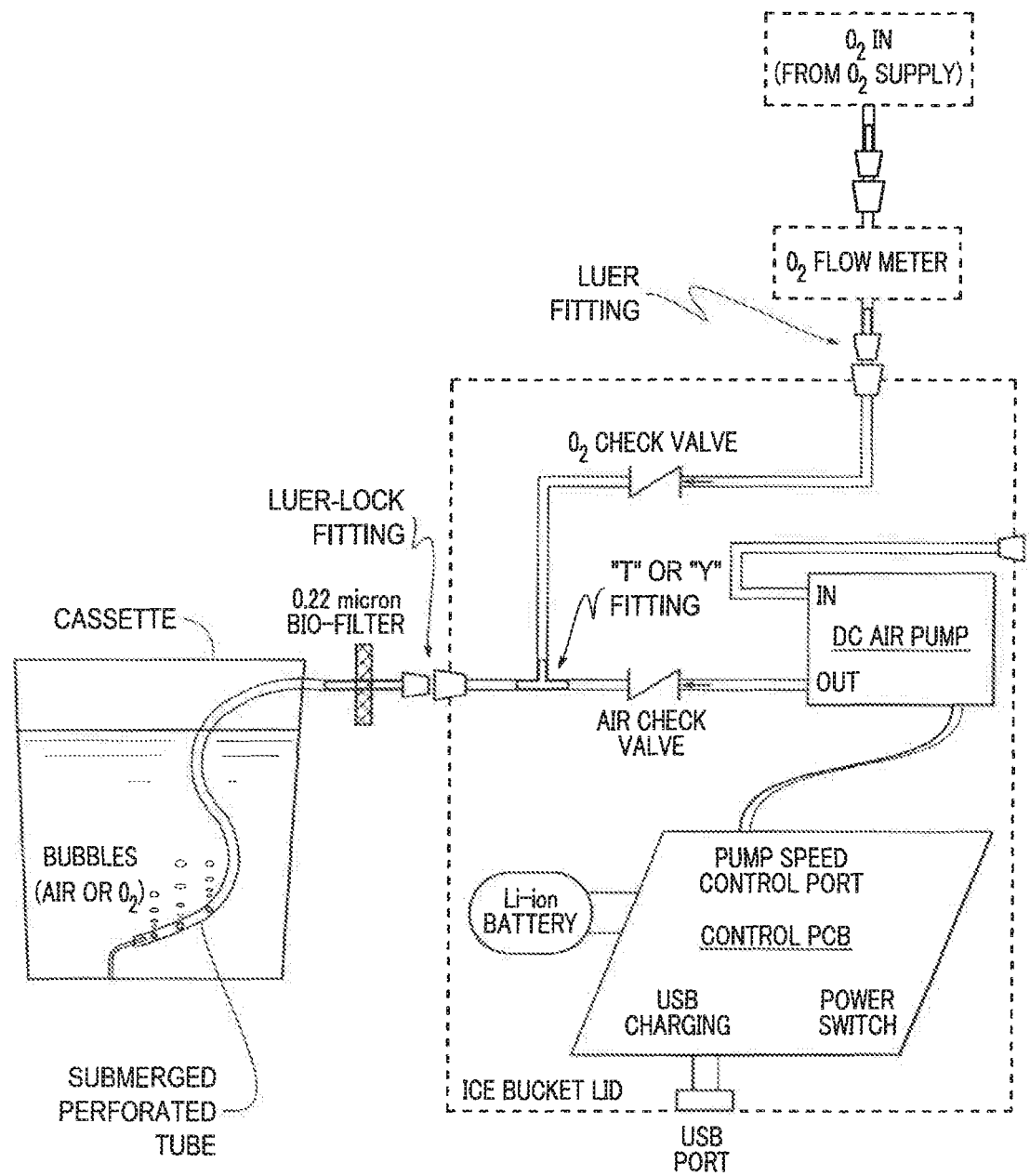
FIG. 1 is a diagram of an oxygenation system.

According to exemplary implementations, an apparatus is provided for streaming oxygen and/or air into a perfusate to oxygenate the perfusate, and perfusing the organ with the oxygenated perfusate. The apparatus may include a perfusion circuit for perfusing the organ or tissue, and an oxygenation system including an oxygen supply device configured to supply oxygen to the perfusate, an inlet for receiving oxygen from an external oxygen source and oxygen line to supply the oxygen from the external source to the perfusate, and an air pump configured to supply air to the perfusate. The oxygenation system may be embedded in the apparatus.

Exemplary implementations may include a method of perfusing an organ or tissue. Such a method may include supplying oxygen or air to a perfusate via an oxygenation system to oxygenate the perfusate, and perfusing the organ or tissue with the oxygenated perfusate. The oxygenation system includes an oxygen supply or an air pump. The oxygen supply may be, for example, an oxygen tank or external oxygen source. The air pump can pump air into the perfusate, for example, when oxygen is not available. The air pump can be autonomous, rechargeable, and reusable. The air pump can be embedded into the perfusion apparatus and is designed to maintain perfusate oxygen tension at physiological levels for up to 24 hours or longer. The user may choose whether to stream oxygen or air, or alternate between the two. The oxygenation system allows a user to connect an external oxygen source during circuit set-up at the donor site, upon arrival at the transplant hospital, or anywhere in between to rapidly charge the perfusate oxygen tension up to supra-physiological levels.

An exemplary perfusion apparatus for an organ includes a cassette or basin in which the organ may be placed. The organ may preferably be a liver, kidney, heart, lung or intestine, but may be any human or animal, natural or engineered, healthy, injured or diseased organ or tissue. The cassette may hold a cradle on which the organ is disposed when the organ is in the apparatus. The cassette and/or perfusion apparatus may include a filter that can function as a gross particulate filter. The cassette and/or the cradle are preferably configured to allow a perfusate bath to form around the organ. The organ cassette may be configured to provide uninterrupted sterile conditions and efficient heat transfer during transport, recovery, analysis and storage, including transition between the transporter, perfusion apparatus and organ diagnostic apparatus, and/or other apparatus.

The cassette or perfusion apparatus may also include a temperature sensor located or focused in or near the cradle. The cassette or apparatus may include multiple temperature sensors, which may provide redundancy in the event of a failure and/or may provide temperature measurement at multiple locations. Preferably, the temperature sensor(s) is an infrared temperature sensor. The temperature sensor(s) is preferably disposed as close as practical to the organ when the organ is disposed in the cradle in order to improve usefulness and accuracy of the temperature sensors, which preferably provide a temperature measurement of the perfusate that may be correlated to a temperature of the organ. Alternatively or additionally, the temperature sensor(s) may be used to directly measure the temperature of the organ.

The cassette or basin is preferably disposed within a recess of an insulating coolant container that may contain cold materials such as ice, ice water, brine or the like. Coolant container may be permanently or removably attached to, or an integral, monolithic part of, apparatus. Thus, in use, the organ is disposed within the cradle, which is disposed within the basin or cassette, which is disposed within the coolant container. The configuration of the coolant container, basin or cassette, and cradle preferably provides a configuration that provides cooling for the organ without the contents of coolant container contacting the organ or the cradle. Although the coolant container is described herein as containing ice or ice water, any suitable cooling medium can be used. Ice or ice water may be preferable due to the ease with which ice can procured, but one of ordinary skill would understand that any suitable cooling medium, which could be an active cooling medium (such as a thermo electric cooler or a refrigerant loop) or a passive cooling medium similar to ice or ice water, or a combination thereof, may be utilized. The amount of ice, or other cooling medium, that can be placed within the coolant container should be determined based upon the maximum time that cooling is to be provided while the organ will be in the apparatus.

The cradle may include components configured to securely restrain the organ in place. Such components may, for example, include user selectable netting that is fastened to the cradle. The user selectable netting keeps the organ in place while the organ is manipulated or moved. For example, the organ may be held in place with the netting on the cradle while being manipulated (e.g., vasculature trimmed, cannulas attached, or the like) before being placed in the basin or perfusion apparatus. Similarly, the organ may be held in place when the organ is moved with the cradle into the basin, when the basin is moved into the coolant container and when the apparatus itself is moved during transport.

An exemplary oxygenation system is illustrated in FIG. 1. The oxygenation system may be embedded in and integrated with a perfusion apparatus of an organ transporter. For example, the oxygenation system may be embedded in a lid of the coolant container or ice bucket of an organ transporter. The oxygenation system includes an oxygen circuit and an air circuit. A user may select to pump oxygen or air from the oxygenation system directly into the perfusate bath in the cassette, or may switch between the air and oxygen. In some embodiments, the selection of pumping air and/or oxygen into the perfusate may be manual, automatic or programmed. For example, a controller may be preprogramed to delivery oxygen for a period of time before switching to the air circuit to delivery air to the perfusate. The tube for delivering the oxygen or the air from the oxygenation system to the perfusate bath in the cassette may be submerged in the perfusate bath. In some embodiments, the tip of the tube may be disposed at or near the bottom of the cassette, or be disposed in any other suitable position, for example, any position within the perfusate bath in the cassette. The tube may include a means for bubbling the oxygen and/or air through the perfusate. For example, the tube may be perforated such that one or more holes are formed on the end or anywhere along the tube submerged in the perfusate bath to allow the oxygen or air to be bubbled through the perfusate. Partial pressure levels of oxygen are elevated by bubbling the oxygen or air through the perfusate. Such supplemental oxygen may be beneficial during hypothermic machine preservation of, for example, donor organs intended for transplant. Supplemental oxygen supplied to organs during hypothermic machine preservation may result in better post-transplant patient outcomes.

As shown in FIG. 1, the oxygen circuit includes a port or inlet for connecting an external oxygen source or oxygen tank. The port may include a luer type fitting or any other suitable fitting. The oxygen supply to the oxygen port may be regulated by an $O_2$ flow meter. The flow meter may include a needle/seat control valve for precise control of oxygen flow. Oxygen can flow into the oxygenation system via the oxygen inlet, for example, luer connection, or via a direct luer connection to the filter, such as a bio-filter, discussed in more detail below. If an oxygen supply is connected to the oxygen port, once the oxygen passes through the port, it may flow downstream through an oxygen check valve and/or a "T" or "Y" fitting to a second port or outlet. The "T" or "Y" fitting may connect the oxygen circuit with the air circuit. Alternatively, the oxygen and air circuits could be separate with separate ports and tubes for delivering oxygen and/or air to the perfusate. For example, the filter or cassette may have two ports for receiving separate tubes for delivery of oxygen and air. There may be one or more outlet ports on the oxygenation system that may have one or more luer-lock fittings or any other suitable fitting for providing a secure connection between the oxygenation system and the biofilter, discussed in more detail below.

In the air circuit, ambient air, such as room air, may enter through an air inlet. The air inlet may have a luer type fitting or any other suitable fitting. An air pump may be configured to allow air to flow from the air inlet to the second port or outlet and into the perfusate bath in the cassette. Once the air passes out of the air pump, the air may flow downstream through an air check valve and/or the "T" or "Y" fitting to the outlet port. Oxygen and air can run when the system lid is open or closed.

The oxygen and air check valves, as well as the filters, discussed below, prevent contamination problems. For example, the oxygen and air check valves may prevent contamination problems associated with reflux in the gas and/or vent lines. For example, the valves may be configured as anti-reflux valves to prevent reflux. The oxygen and air check valves may be any suitable valves or other devices, such as an on/off switch that may be manually or automatically controlled by the controller.

Once the air and/or oxygen flows through the outlet port, it will flow through a tube into the cassette and into the perfusate. One or more filters, such as a bio-filter or any other suitable filter, may be provided between the second port and the cassette. The filter may be bonded to an outside end of a tube that is connected to the outlet port on the oxygenation system via, for example, a luer-lock fitting or any other suitable fitting. One or more filters may also be located between the cassette and the perfusion circuit, discussed in more detail below. For example, a filter may be located between the oxygenation system and the cassette, upstream of the oxygenation system, between the cassette and the perfusion circuit, and/or any other suitable location.

The one or more filters prevent contamination problems. For example, the filters may facilitate clean air and/or oxygen passing from the oxygenation system into the cassette and perfusate, while restricting dirt, dust, liquids and other contaminants from passing. The pore size of the filters, such as a bio-filter or microbial filter, can be selected to prevent bacteria from passing. For example, the filter may have a pore size of 0.22 micron to allow only sterile oxygen and/or air to enter the cassette.

The filter may be, for example, a microbial filter, to ensure sterility, or otherwise prevent contamination, of the oxygen and/or air supplied from the oxygenation system. As would be appreciated by one of ordinary skill, any suitable device to ensure sterility of, or prevent contamination of, the oxygen may be provided instead of a filter. Any device utilized to ensure sterility, or otherwise prevent contamination, of the oxygen and/or air supply may be a disposable component.

The tube through which the oxygen and/or air flows after exiting the outlet on the oxygenation system or the filter may have a weighted tip such that the tube is submerged in the perfusate. The weighted tip keeps the tube in the bottom of the cassette, as shown in FIG. 1. The tube may be perforated to allow the oxygen and air to bubble through the perfusate, as shown in FIG. 1. A small molded-in boss may be provided on the inside of the cassette to precisely locate and orient the tip of the bubbler, as shown in FIG. 1. Oxygen levels are elevated by bubbling through the perfusate. Such supplemental oxygen may be beneficial during hypothermic machine preservation of organs. For example, perfusing organs intended for transplant with supplemental oxygen may provide better post-transplant patient outcomes.

The air pump may be any pump suitable for pumping air in a perfusion apparatus. For example, the air pump may be an electro-mechanical pressure generator, such as a DC air pump. The pump speed may be controlled by a potentiometer, such as a 5-position potentiometer. For example, the pump flow rate may be about 25 ml/min to about 500 ml/min, about 50 to about 250 ml/min, about 100 ml/min to about 200 ml/min, or about 150 ml/min to about 250 ml/min. The air pump may run intermittently. The pump may be controlled by a controller, such as a control PCB or any other suitable controller. For example, based on user input, a controller may direct the air pump to supply air to the perfusate or to allow oxygen to be supplied to the perfusate via the oxygen circuit.

The present apparatus allows oxygen and/or air to be pumped into the perfusate. For example, oxygen may be pumped into the perfusate during preparation, before connecting the organ to the apparatus. Oxygen or air may be pumped into the perfusate during preparation for about thirty minutes to 3 hours, about an hour, about two hours, or any other suitable time. In one embodiment, after pumping oxygen through the perfusate for a period of time, the apparatus may be switched to pump air into the perfusate. Alternatively, after pumping air through the perfusate, the apparatus may be switched to pump oxygen. In another embodiment, after pumping oxygen into the perfusate for a period of time, oxygen available in the headspace of the cassette could be recirculated through the oxygenation system and into the bubbler instead of switching to air. In such an embodiment, a filter, such as a bio-filter, may be provided on both the intake and output of the recirculation system to protect the pump from contamination. A user may select whether to pump oxygen or air into the perfusate. In some embodiments, a combination of oxygen and air may be delivered into the perfusate.

An electronics module may also be provided in the organ transporter. The electronics module may be cooled by vented air convection, and may further be cooled by a fan. The electronic module may be positioned separate from the perfusion and oxygenation/air tubes to prevent the perfusate from wetting electronics module and to avoid adding extraneous heat from the electronics module to the perfusate.

Although the oxygenation system has been described with respect to specific embodiments illustrated in FIG. 1, any suitable devices, valves, filters, tubing, pumps, and configurations thereof may be used.

Figure 2:
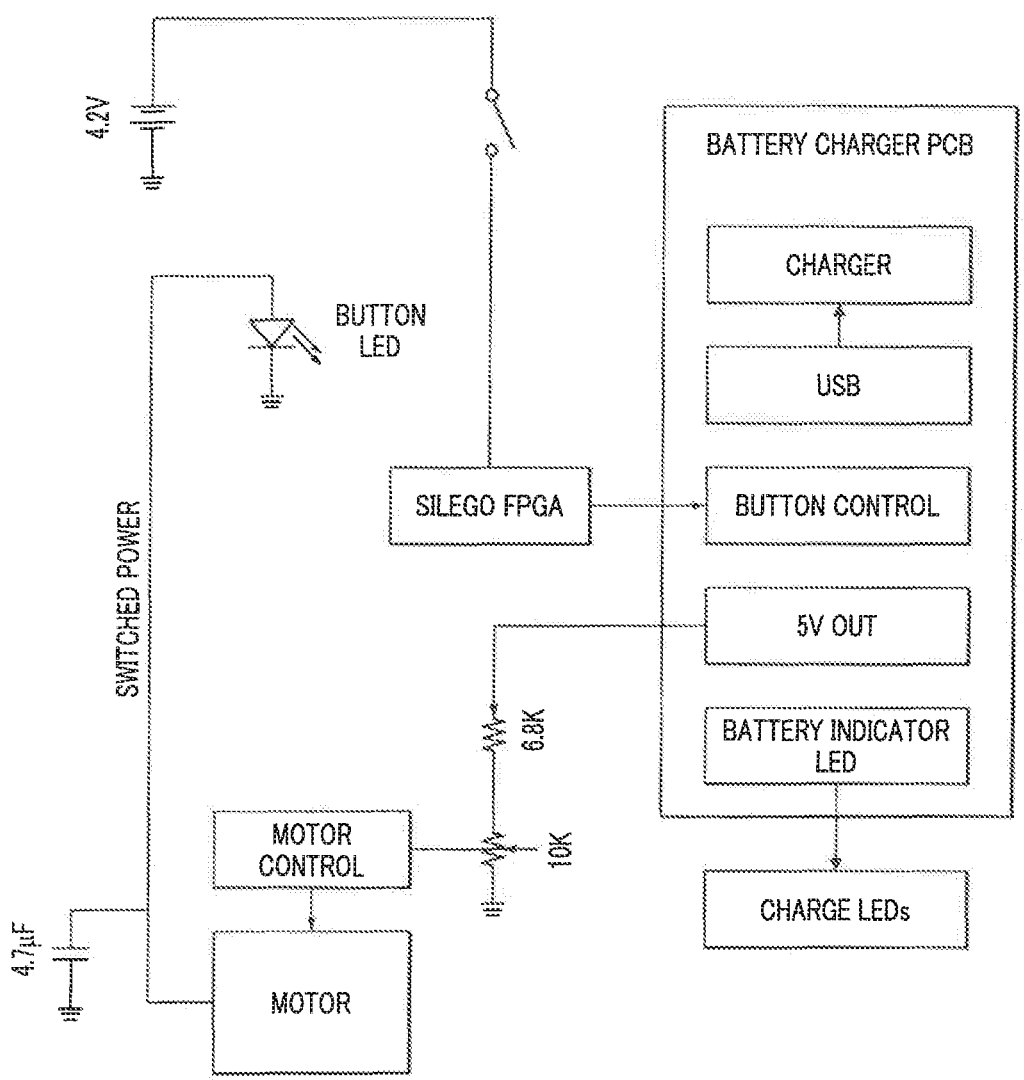
FIG. 2 is a schematic diagram of an electrical circuit for an oxygenation system.

FIG. 2 shows a schematic diagram of an electrical circuit for the air pump. The pump may be powered by batteries. The batteries may be rechargeable and are preferably rapidly rechargeable. For example, the batteries may be rechargeable lithium-ion, lithium-ion polymer, lead-acid, nickel-cadmium, nickel-metal hydride, and solid state batteries. The battery pack may be selected so that it can be taken onboard airplanes as organs are frequently transported by aircraft. The air pump may run up to 24 hours or more on a single charge. One or more LED indicators may be provided on the organic transporter to indicate when battery charge status and/or power status. A USB port or micro-USB port may be provided for charging the batteries within the oxygenation system. The USB port is preferably waterproof. The USB port may be located on a side of the oxygenation system for easy access. For example, when the oxygenation system is embedded in an organ transporter, the USB port may be located on a side of the transporter or a side of a component of the transporter, such as the lid to the coolant container or ice bucket.

The perfusion apparatus and integrated oxygenation system may include an integrated control panel, including a power on/off switch. The on/off switch is preferably waterproof. The control panel may also display characteristics, such as, but not limited to, a charge status indicator, power status indicator, infusion pressure, error or fault conditions, flow rate, flow resistance, infusion temperature, bath temperature, pumping time, temperature profile (maximums and minimums), cover open or closed, history log or graph, and additional status details and messages, some or all of which may be further transmittable to a remote location for data storage and/or analysis. For example, as shown in FIG. 2, the charge status and power status indicators may be provided as, for example, LEDs. Flow and pressure sensors or transducers may be provided to monitor various organ characteristics including pump pressure and vascular resistance of an organ, which can be stored in computer memory to allow for analysis of, for example, vascular resistance history, as well as to detect faults in the apparatus, such as elevated pressure.

The perfusion apparatus and oxygenation system are constructed to fit or mate within an organ transporter such that efficient heat transfer is enabled. Preferably, the organ transporter contains a compartment for receiving the perfusion apparatus and oxygenation system. For example, the organ transporter may rely on conduction to move heat from the cassette to coolant contained in a compartment. This movement of heat allows the transporter to maintain a desired temperature of the perfusion solution.

Perfusate expelled from the organ and/or contained in the perfusate bath in the cassette is pumped out through tubing by a pump for circulation through a perfusion circuit, which may include filters, sensors, oxygenators, and bubble traps, as discussed in more detail below. In an exemplary perfusion apparatus, when the perfusate is pumped out of the cassette, it may pass through filter, such as a gross particulate filter. After passing through the filter, the perfusate flows along a first flow path that includes a suitable fluid conduit, such as flexible or rigid tubing, a pump, a pressure sensor, a second filter, an oxygenator, and a bubble trap, each of which is discussed below. In combination with one or both of the portal flow path and the hepatic flow path (discussed below), the first flow path may form a recirculating perfusate flow path that provides perfusate to the organ and then recirculates the perfusate.

The first filter is preferably a relatively coarse filter (relative to the second filter). Such a coarse filter may be provided to prevent large particles, which may for example be byproducts of the organ or of the organ being removed from the donor, from entering and clogging fluid paths of the apparatus. The first filter may be an integral part of the cassette or the first filter may be disposed elsewhere in the first flow path downstream of the cassette. For example, the first filter may also be a separate component from the cassette or disposed within the fluid conduit.

The first flow path may also include a pump. The pump may be any pump that is suitable in connection with perfusing of organs. Examples of suitable pumps may include hand operated pumps, centrifugal pumps and roller pumps. If a roller pump is included, the roller pump may include a single channel or flow path (where only one tube is compressed by the rollers) or the roller pump may include multiple, parallel channels or flow paths (where multiple tubes are compressed by the rollers). If multiple, parallel channels or flow paths are included, the rollers may preferably be disposed out of phase or offset so that pulses created by the rollers are out of phase, which may result in a fluid flow out of the roller pump that is relatively less pulsatile than would be the case with a single roller. Such a multiple channel roller pump may achieve a constant flow rate or a minimally pulsatile flow rate, which may be advantageous depending on the other components in the flow path and/or the type of organ being perfused.

The flow path may include a pressure sensor. The pressure sensor may preferably be disposed after the outlet of the pump in order to monitor and/or be used to control the pressure produced at the outlet of the pump by way of a suitable controller. The pressure sensor may provide continuous or periodic monitoring of pressure.

The flow path may include an oxygenator such as an oxygenator membrane or body to provide oxygenation to the perfusate. The oxygen may be provided, for example, by way of an oxygen generator or oxygen concentrator, which may be separate from the apparatus or integral to the apparatus. For example, the oxygen generator or concentrator may be contained within the apparatus or the oxygen generator or concentrator may be an external device that can be connected to the apparatus to supply oxygen to the apparatus. Oxygen may be generated through any suitable means, some examples of which include through pressure swing adsorption using a molecular sieve (such as a zeolite), through a ceramic oxygen generator (a solid state oxygen pump) or through decomposition of water. Each type of oxygen generator or concentrator discussed above may be adapted to be separate from or integral to the apparatus; however, some devices may be more advantageously adapted to be integral or separate. For example, an electrochemical oxygen generator may be relatively compact (on the order of a few cubic inches including a water reservoir) and therefore well suited to being integral, whereas a pressure swing adsorption device may be relatively large (due to the size of adsorbent material containers and need for a pressurized air source, such as a compressor) and therefore well suited to be separate.

The oxygen generator or concentrator preferably produces oxygen in real time to provide oxygenation to the perfusate, but oxygen may also be produced and stored for short or long periods as dictated by the oxygen consumption requirements and the technology selected for producing oxygen. The oxygen generator or concentrator may continuously or non-continuously produce oxygen depending on the need to oxygenate perfusate and/or the type of device used to produce the oxygen. The apparatus may be configured such that there is no oxygen storage for oxygen produced from the oxygen generator or concentrator, except for any residual oxygen contained within plumbing or a conduit(s) from an outlet of the oxygen generator or concentrator to the oxygenator. In other words, it may be preferable that the apparatus 10 does not include any structures specifically configured for oxygen storage. The apparatus 10 may include a device, such as a microbial filter, to ensure sterility, or otherwise prevent contamination, of the oxygen supplied to the oxygenator. Preferably such a device is located between the oxygen generator or concentrator and the oxygenator, but may also be upstream of the oxygen generator or concentrator or in both locations. Preferably, any device utilized to ensure sterility, or otherwise prevent contamination, of the oxygen supply is a disposable component. As would be appreciated by one of ordinary skill, any suitable device to ensure sterility of, or prevent contamination of, the oxygen may be provided instead of a microbial filter.

The flow path may include an oxygenator such as an oxygenator membrane or body to provide oxygenation to the perfusate. Oxygen may be provided to the oxygenator by any suitable means. Suitable oxygen sources may include pure oxygen or mixed gases such as air. The gas may be compressed, such as in a high-pressure cylinder, liquefied as would be stored in a dewar, or drawn from the surrounding atmosphere. Preferably, the oxygen may be provided by way of an oxygen generator, which may be separate from the apparatus or integral to the apparatus. Oxygen may be generated through any suitable means, some examples of which include through pressure swing adsorption using a molecular sieve, through a ceramic oxygen generator (a solid state oxygen pump) or through decomposition of water.

The flow path may include a bubble trap. The bubble trap preferably separates gas bubbles that may be entrained in the perfusate flow and prevents such bubbles from continuing downstream and entering the organ. The bubble trap may also function as an accumulator that reduces or eliminates pulsatility of the perfusate flow. The bubble trap may include a volume of gas, initially or through the accumulation of bubbles, such that pressure fluctuations in the perfusate are dampened or eliminated.

The bubble trap may include a vent that allows purging of gas during start up or a purging process. The vent may be connected to or part of purge flow path (which is discussed in detail below). The vent is preferably open during a start up process so that any air or other gas may be purged from the perfusate path. Once the gas is purged from the perfusate path, the vent may preferably be closed. The vent may be closed manually or may be closed automatically by way of controller.

The bubble trap may include a level sensor. A level sensor may optionally be used during the purging process to determine when the purging is complete and/or may be used to determine when the purging process needs to be repeated, which may happen after bubbles have been trapped in the bubble trap. Also, through the use of the level sensor and the vent, the accumulator function of the bubble trap can be tuned to account for differing amplitudes and frequencies of pulsatility in the perfusate flow.

The bubble trap may have any number of outlets, as needed for a given application of the perfusion apparatus. For example, three outlets may be connected to three different flow paths, which may be particularly suited for the perfusion of a liver. When perfusing a liver, the three paths preferably include portal flow path connected to the portal vein of a liver, hepatic flow path connected to the hepatic artery of a liver, and bypass flow path that provides a return path to the cassette or basin. There may also be a port in any fluid path that allows fluid access to the perfusate solution. The port may preferably be located in the bubble trap. This port may preferably include a luer type fitting such that a user may extract a small a sample of the perfusate for analysis. The port may also be utilized by a user to administer substances to the perfusate without opening the cassette or basin. In some embodiments, more than one oxygenator and/or bubble trap may be provided. For example, an oxygenator and a bubble trap could be provided for each of the portal flow path and the hepatic flow path. Such a configuration may allow for different levels of oxygenation in each of the portal flow path and hepatic flow path. A single oxygen concentrator or generator may provide oxygen to both the portal flow path and the hepatic flow path, or separate oxygen concentrators or generators may be provided for each flow path. If a single oxygen concentrator or generator provides oxygen to both flow paths, suitable valves such as on/off valves and/or pressure regulators may control the oxygen supplied to each flow path to be different.

The portal flow path and hepatic flow path may optionally include similar or different components such as valves; bubble sensors; flow sensors; flow control clamps; and pressure sensors. Each similar component may function in a similar manner, and such pairs of components may optionally be structurally and/or functionally identical to reduce manufacturing costs. Flow sensors may preferably be ultrasonic sensors disposed around tubing, although any suitable sensor may be used. Ultrasonic sensors may be advantageous because in normal usage such sensors do not come into contact with the perfusate and therefore are not in the sterile path. Such an implementation of ultrasonic sensors does not require replacement and/or cleaning after use.

Valves may be pinch valves that function to squeeze tubing and reduce or shut off flow, but any suitable valve may be used. Pinch valves may be advantageous because in normal usage they do not come into contact with the perfusate and therefore do not require replacement and/or cleaning after use.

Preferably, the bubble sensors are ultrasonic sensors disposed around tubing, although any suitable sensor may be used. Similar to pinch valves, ultrasonic sensors may be advantageous because in normal usage they do not come into contact with the perfusate and therefore do not require replacement and/or cleaning after use. Instead, ultrasonic sensors can be disposed in contact with, adjacent to or around an external surface of tubing in order to sense bubbles.

Flow control clamps may be used to fine-tune the flow rate in one or both of portal flow path and hepatic flow path. Preferably, the organ provides self-regulation to control an amount of flow that exits the bubble trap and is divided between the portal flow path and the hepatic flow path. In such self-regulated flow, pressure sensors provide overpressure monitoring. In the event that pressure delivered to the organ in either or both of the portal flow path or the hepatic flow path exceeds a predetermined threshold, the apparatus can automatically stop and/or reduce the flow rate provided by the pump to prevent damage to the organ. In addition or alternatively, the pressure sensors may be used to generate warning signals to the user and/or to an appropriate controller as pressures approach the predetermined threshold.

After exiting one or both of the portal flow path and hepatic flow path, pefusate flows through the organ and returns to the basin to form an organ bath.

Bypass flow path may include a valve, and/or sensors such as oxygen sensor and pH sensor. Preferably, the valve is a pinch valve and may be of similar configuration to valves and, but any suitable valve may be used. The oxygen sensor and the pH sensor may be used to determine the state of the perfusate. Preferably, the bypass flow path is only used during a purging or priming process, although it may also be used during perfusion, preferably continuously, to monitor perfusate properties in real time.

The organ perfusion apparatus may also include an accelerometer. Preferably the accelerometer is a three-axis accelerometer, although multiple single axis accelerometers may be used to the same effect. The accelerometer may be used to continuously or periodically monitor and/or record the state of the apparatus. Monitoring may include monitoring for excessive shocks as well as attitude of the apparatus. By implementing such monitoring, misuse or potentially inappropriate conditions of the apparatus can be detected and recorded.

The apparatus may include storage compartments for items other than the organ. For example, the apparatus may include a document compartment to store documents and/or charts related to the organ. Also, the apparatus may include one or more sample compartment. The sample compartment may be configured, for example, to store fluid and/or tissue samples. The sample compartment may be advantageously disposed near the coolant container to provide cooling, which may be similar or equivalent to the cooling provided for the organ.

The apparatus may include one or more tamper evident closures. A tamper evident closure may be used to alert a user that the apparatus has been opened at an unauthorized time and/or location and/or by an unauthorized person. Evidence of tampering may alert the user to perform additional testing, screening, or the like before using the organ and/or the apparatus.

The organ transporter is preferably portable for carrying organs or tissues from place to place, and is sized to be carried by one or two persons and loaded into an automobile or small airplane. The perfusion apparatus and integrated oxygenation system preferably may be an organ transporter that is designed to be portable, for example, having dimensions smaller than length 42 inches×width 18 inches×height 14 inches and a weight less than 90 lbs, which includes the weight of the complete loaded system (for example, transporter, disposable components, organ, ice and 3 liters of perfusate solution).

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention.

What is claimed is:

1. An apparatus for perfusing an organ or tissue, comprising:
   a coolant container including a lid;
   a cassette configured to hold the organ or tissue, the cassette being disposed in the coolant container;
   a perfusion circuit for perfusing the organ or tissue with liquid perfusate; and
   an oxygenation system for oxygenating the perfusate that recirculates through the perfusion circuit, comprising:
      an oxygen circuit configured to deliver oxygen to the liquid perfusate;
      an air circuit configured to deliver ambient air to the liquid perfusate; and
      an air pump for pumping the ambient air into the perfusate via the air circuit, and
   a recirculation system configured to recirculate oxygen available in a headspace of the cassette through the oxygenation system and into the liquid perfusate, the recirculation system including a bio-filter on at least one of an intake and an output of the recirculation system, wherein the oxygenation system including the air pump is embedded into the lid of the coolant container.

2. The apparatus according to claim 1, wherein the oxygenation system is configured to bubble the oxygen or air through the liquid perfusate.

3. The apparatus according to claim 1, wherein the apparatus is configured to maintain perfusate oxygen tension at a physiological level.

4. The apparatus according to claim 1, wherein the oxygenation system is configured to switch between delivering oxygen to the liquid perfusate via the oxygen circuit and delivering air to the perfusate via the air circuit based on user input.

5. The apparatus according to claim 1, further comprising a tube for delivering the oxygen and/or air to the perfusate.

6. The apparatus according to claim 5, wherein the tube is perforated.

7. The apparatus according to claim 5, wherein the tube is submerged in the perfusate.

8. The apparatus according to claim 1, wherein the cassette further comprises a perfusate bath.

9. The apparatus according to claim 8, wherein the oxygen and/or air is delivered to the perfusate bath in the cassette.

10. The apparatus according to claim 1, wherein the air pump is powered by rechargeable batteries.

11. The apparatus according to claim 1, wherein the bio-filter is disposed on both of the intake and the output of the recirculation system.

12. A method of perfusing an organ or tissue via the apparatus according to claim 1, comprising:

supplying oxygen or air to a liquid perfusate to oxygenate liquid perfusate via the oxygenation system; and perfusing the organ or tissue with the oxygenated perfusate via the perfusion circuit.

13. The method according to claim 12, wherein the oxygen or air is bubbled through the perfusate.

14. The method according to claim 12, wherein the air is ambient air that is delivered to the perfusate via the air pump.

15. The method according to claim 12, further comprising switching between supplying oxygen to the liquid perfusate via the oxygen circuit and supplying air to the liquid perfusate via the air circuit.

16. The method according to claim 12, wherein perfusate oxygen tension is maintained at a physiological level.

* * * * *